US009386519B1

(12) United States Patent
Gong et al.

(10) Patent No.: US 9,386,519 B1
(45) Date of Patent: *Jul. 5, 2016

(54) METHOD AND APPARATUS FOR TRANSITIONING A FIRST PROCESSOR OF AN ACCESS POINT BETWEEN POWER MODES BASED ON COMMUNICATION BETWEEN A CLIENT DEVICE AND A SECOND PROCESSOR OF THE ACCESS POINT (71) Applicant: Marvell International LTD., Hamilton (BM)

(72) Inventors: Yubin Gong, Pleasanton, CA (US); Chor-Teck Law, Fremont, CA (US); Brian Bosso, Santa Clara, CA (US); Rajesh Shreeram Bhagwat, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,333

(22) Filed: Nov. 10, 2014

Related U.S. Application Data

(63) Continuation of application No. 12/751,305, filed on Mar. 31, 2010, now Pat. No. 8,885,531.

(60) Provisional application No. 61/169,834, filed on Apr. 16, 2009.

(51) Int. Cl.
*G08C 17/00* (2006.01)
*G08C 15/00* (2006.01)
(Continued)

(52) U.S. Cl.
CPC .......... *H04W 52/0206* (2013.01); *H04W 12/06* (2013.01)

(58) Field of Classification Search
None
See application file for complete search history.

(56) References Cited

U.S. PATENT DOCUMENTS

| 7,124,300 | B1* | 10/2006 | Lemke | G06F 21/32 340/5.53 |
| 8,023,444 | B2* | 9/2011 | Bowser | G06F 1/3203 370/311 |

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

*Primary Examiner* — Kiet Tang (57) ABSTRACT

An access point including a first processor and a network device. The network device is separate from the first processor. The first processor transitions between first and second power modes. The network device includes a second processor and first and second interfaces. The second processor, while the first processor is in the second power mode, (i) causes the second interface to transmit a beacon, or (ii) receives a probe request from a client device. The second interface, while the first processor is in the second power mode, (i) transmits a probe response over a wireless local area network to the client device based on the beacon or the probe request, and (ii) receives an authentication frame from the client device based on the probe response. The second processor, in response to the authentication frame, signals the first processor via the first interface to transition to the first power mode.

20 Claims, 4 Drawing Sheets

(51) Int. Cl.
*H04M 1/66* (2006.01)
*G06F 15/16* (2006.01)
*H04W 52/02* (2009.01)
*H04W 12/06* (2009.01)

(56) References Cited

U.S. PATENT DOCUMENTS

| | | | | |
|---|---|---|---|---|
| 8,068,433 | B2* | 11/2011 | Hodges | G06F 1/3209 |
| | | | | 370/216 |
| 2005/0132239 | A1 | 6/2005 | Athas et al. | |
| 2009/0040954 | A1 | 2/2009 | Usuba | |
| 2009/0290520 | A1 | 11/2009 | Roberts et al. | |
| 2010/0080158 | A1 | 4/2010 | Stahl | |
| 2010/0284368 | A1 | 11/2010 | Haddad et al. | |

OTHER PUBLICATIONS

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999/Cor Jan. 2001 (Corrigendum to IEEE Std 802.11b-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 2: Higher-Speed Physical Layer Extension in the 2.4 GHz Band—Corrigendum 1; LAN/MAN Standards Committee of the IEEE Computer Society; Nov. 7, 2001, 23 pages.

IEEE Std 802.11e/D11.0, Oct. 2004 (Amendment to ANSI/IEEE Std 80211-1999 (2003 Reaff) edition as amended by IEEE Std 802.11g-2003, IEEE Stad 802.11h-2003 and IEEE 802.11i-2004); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 7: Medium Access Control (MAC) Quality of Service (QoS) Enhancements; LAN/MAN Standards Committee of the IEEE Computer Society; 195 pages.

IEEE Std 802.11i (Amendment to IEEE Std 802.11, 1999 Edition (Reaff 2003) as amended by IEEE Stds 802.11a-1999, 802.11b-1999, 802.11b-1999/Cor Jan. 2001, 802.11d-2001, 802.11g-2003, and 802.11h-2003); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 6: Medium Access Control (MAC) Security Enhancements; LAN/MAN Standards Committee of the IEEE Computer Society; Jul. 23, 2004; 190 pages.

IEEE P802.11k/D7.0, Jan. 2007; Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment: Radio Resource Measurement; LAN/MAN Standards Committee of the IEEE Computer Society; 194 pages.

IEEE Std 802.11v/D1.02; Draft Standard for Information technology—Telecommunications and information exchange between systems—Local and metropolitan area networks—Specific requirements—Part 11: Wireless LAN Medium Access Control (MAC) and Physical Layer (PHY) specifications: Amendment 9: Wireless Network Management; Sep. 2007; 204 pages.

IEEE P802.11w/D4.0, Nov. 2007; Draft Standard for Information technology—Telecommunications and information exchange between systems—Local and metropolitan area networks—Specific requirements—Part 11: Wireless LAN Medium Access Control (MAC) and Physical Layer (PHY) specifications: Amendment 5: Protected Management Frames; IEEE 802 Committee of the IEEE Computer Society; 63 pages.

\* cited by examiner

มาเธอด AND APPARATUS FOR TRANSITIONING A FIRST PROCESSOR OF AN ACCESS POINT BETWEEN POWER MODES BASED ON COMMUNICATION BETWEEN A CLIENT DEVICE AND A SECOND PROCESSOR OF THE ACCESS POINT

CROSS-REFERENCE TO RELATED APPLICATIONS

The present disclosure is a continuation of U.S. patent application Ser. No. 12/751,305 (now U.S. Pat. No. 8,885,531), filed Mar. 10, 2010. This application claims the benefit of U.S. Provisional Patent Application Ser. No. 61/169,834, filed Apr. 16, 2009. The entire disclosures of the application referenced above are incorporated herein by reference.

BACKGROUND

The present disclosure relates generally to wireless network communications. More particularly, the present disclosure relates to techniques for conserving power in wireless access points.

SUMMARY

In general, in one aspect, an embodiment features an apparatus comprising: a host device comprising a first network interface configured to communicate over a wired local-area network, and a first processor; and a wireless network device comprising a second network interface configured to communicate over a wireless local-area network, and a second processor configured to cause the second network interface to transmit IEEE 802.11 beacon frames and IEEE 802.11 probe response frames over the wireless local-area network without communicating with the first processor of the host device.

Embodiments of the apparatus can include one or more of the following features. In some embodiments, the second processor is further configured to cause the first processor to authenticate, and to associate with, a wireless client responsive to the second network interface receiving an IEEE 802.11 authentication frame from the wireless client over the wireless local-area network. In some embodiments, the second processor is further configured to cause the first processor to leave a low-power mode responsive to the second network interface receiving the IEEE 802.11 authentication frame from the wireless client over the wireless local-area network; and the first processor authenticates, and associates with, the wireless client subsequent to leaving the low-power mode. In some embodiments, the first processor is further configured to exchange data frames with the wireless client over the wireless local-area network. In some embodiments, the second processor is further configured to cause the first processor to enter the low-power mode responsive to the second network interface receiving an IEEE 802.11 de-authentication frame from the wireless client over the wireless local-area network. In some embodiments, the second processor is further configured to exchange data frames with the wireless client over the wireless local-area network without communicating with the first processor. In some embodiments, the first processor is further configured to enter the low-power mode subsequent to the first processor authenticating, and associating with, the wireless client. In some embodiments, the second processor is further configured to authenticate, and to associate with, a wireless client, without communicating with the first processor, responsive to the second network interface receiving an IEEE 802.11 authentication frame from the wireless client over the wireless local-area network. In some embodiments, the second processor is further configured to exchange data frames with the wireless client over the wireless local-area network without communicating with the first processor. Some embodiments comprise a wireless access point comprising the apparatus.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears.

DETAILED DESCRIPTION

The subject matter of the present disclosure relates to wireless access points in wireless communication networks. Embodiments of the present disclosure provide elements of a wireless access point capable of conserving power during operation. Several power-save modes are disclosed.

Figure 1:
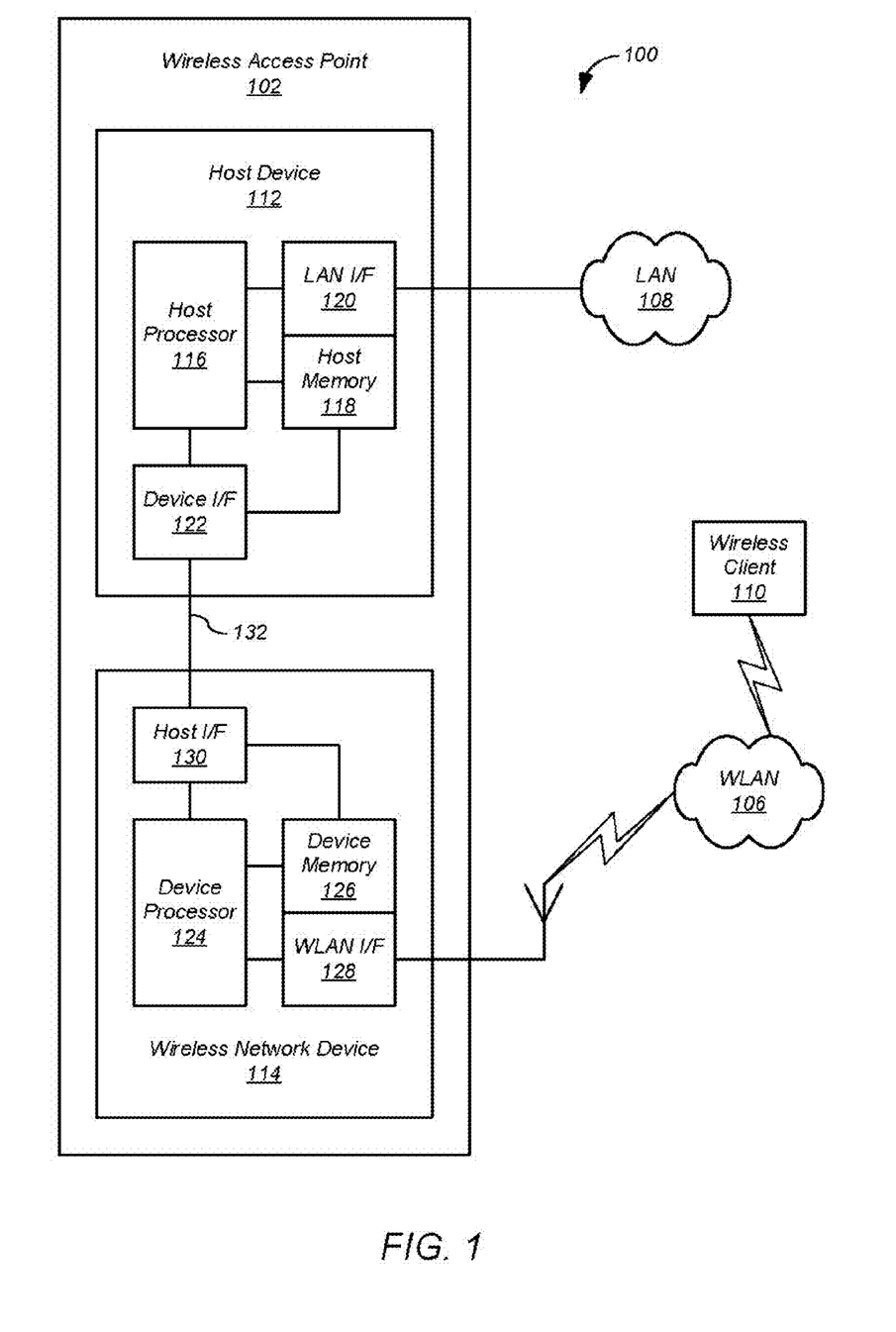
FIG. 1 shows elements of a data communication system comprising a wireless access point in communication with a wireless network and a wired network according to one embodiment.

FIG. 1 shows elements of a data communication system 100 comprising a wireless access point 102 in communication with a wireless network 106 and a wired network 108 according to one embodiment. Although in the described embodiments, the elements of wireless access point 102 are presented in one arrangement, other embodiments may feature other arrangements. For example, elements of wireless access point 102 can be implemented in hardware, software, or combinations thereof.

Also shown in FIG. 1 is a wireless client 110 in communication with network 106. For clarity, only one wireless client 110 is shown. However, it should be understood that any number of wireless clients 110 can be employed.

In the described embodiments, wireless network 106 is implemented as a wireless local-area network (WLAN), and wired network 108 is implemented as a local-area network (LAN). In addition, WLAN 106, wireless access point 102, and wireless client 110 are compliant with all or part of IEEE standard 802.11, including draft and approved amendments such as 802.11a, 802.11b, 802.11e, 802.11g, 802.11i, 802.11k, 802.11n, 802.11v, and 802.11w. However, the techniques disclosed herein apply to other types of wireless networks and devices as well.

Wireless access point 102 includes a host device 112 and a wireless network device 114. Host device 112 communicates with wireless network device 114 over a peripheral bus 132. In various embodiments, peripheral bus 132 is implemented as a Peripheral Component Interconnect (PCI) bus, a Peripheral Component Interconnect Express (PCIe) bus, a Universal Serial Bus (USB), a Secure Digital Input Output (SDIO) bus, and the like. In some embodiments, wireless access point 102 includes multiple wireless network devices 114, each in communication with a respective WLAN 106. For example, wireless access point 102 can include two wireless network devices 114, one operating at 2.4 GHz, and the other operating at 5 GHz. However for clarity, only one wireless network device 114 is described.

Host device 112 includes a host processor 116, a host memory 118, a LAN interface (I/F) 120 configured to communicate over LAN 108, and a device interface 122 connected to peripheral bus 132. Wireless network device 114 includes a device processor 124, a device memory 126, a WLAN interface 128 configured to communicate over WLAN 106, and a host interface 130 connected to peripheral bus 132.

According to a first power-save mode, host device 112 is capable of placing wireless network device 114 into a low-power mode. For example, host processor 116 can issue a command to wireless network device 114 using in-band signaling over peripheral bus 132. Alternatively, out-of-band signaling can be used, for example such as a General Purpose Input/Output (GPIO) interface or the like. In response, device processor 124 places one or more elements of wireless network device 114 into a low-power mode, for example by reducing power (e.g., from a nominal value), or cutting power completely, to those elements. In embodiments having multiple wireless network devices 114, host device 112 can place each wireless network device 114 into the low-power mode independently. Host device 112 can subsequently cause wireless network device 114 to leave the low-power mode, for example by issuing another command over peripheral bus 132. One advantage of this approach is that firmware in device memory 126 need not be reloaded after leaving the low-power mode. Alternatively, host device 112 can simply cut power to wireless network device 114. However, firmware must be reloaded into device memory 126 when power is restored to wireless network device 114.

According to other power-save modes, host device 112 can be placed in a low-power mode, where one or more elements of host device 112 are placed into a low-power mode, for example by cutting power to those elements. In some cases, wireless network device 114 causes host device 112 to enter and/or leave the low-power mode, for example using in-band signaling, out-of-band signaling, and the like. In other cases, host device 112 enters and/or leaves the low-power mode autonomously, for example according to levels of activity in host device 112.

According to a second power-save mode, discovery functionality on WLAN 106 is handled by wireless network device 114. Host device 112 can remain in low-power mode when no wireless clients are connected to wireless network device 114. When a wireless client attempts to connect, host device 112 leaves low-power mode to handle authentication, association, and data exchange.

Figure 2:
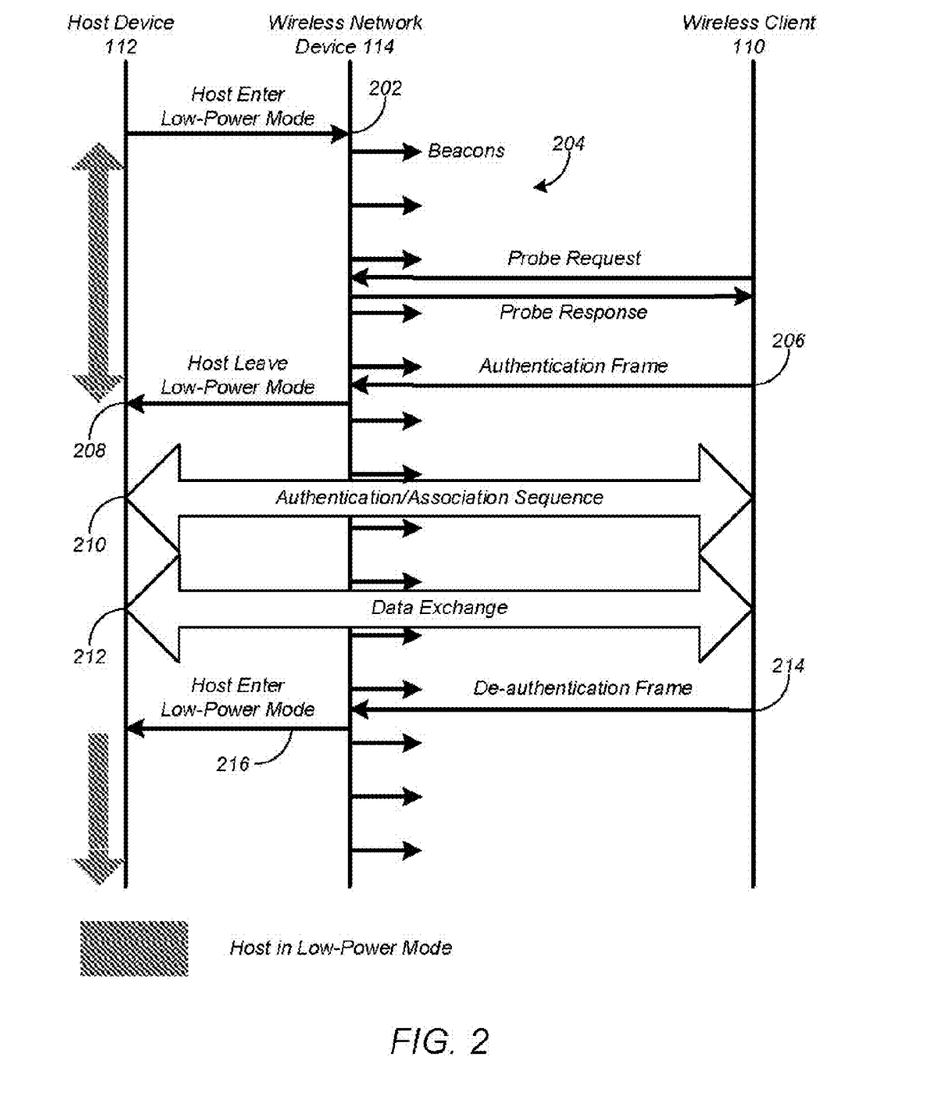
FIG. 2 illustrates a power-save mode according to a second embodiment.

FIG. 2 illustrates this second power-save mode according to one embodiment. Referring to FIG. 2, host device 112 enters low-power mode, either autonomously or in response to a command issued by wireless network device 114, as shown at 202. While host device 112 remains in low-power mode, wireless network device 114 handles beaconing and probes, as shown at 204. In particular, (in one embodiment) without communicating with host processor 116, device processor 124 causes WLAN interface 128 to transmit IEEE 802.11 beacon frames, and to transmit IEEE 802.11 probe response frames in response to received IEEE 802.11 probe request frames. In such an embodiment, host processor 116 is not required to perform any packet processing on frames—e.g., data frames, beacon frames, and/or probe request frames—transmitted through WLAN interface 128.

When a wireless client 110 wishes to exchange data frames with wireless access point 102, wireless client 110 transmits an IEEE 802.11 authentication frame, which is received by WLAN interface 128 of wireless access point 102, as shown at 206. In response to the authentication frame, device processor 124 causes host processor 116 to leave the low-power mode, as shown at 208, and to authenticate, and associate with, wireless client 110, as shown at 210. In particular, device processor 124 issues a command to host device 112 that causes host device to leave the low-power mode. After leaving the low-power mode, host processor 116 authenticates, and associates with, wireless client 110.

In this second power-save mode, host device 112 also handles the exchange of data frames with wireless clients 110. In particular, host processor 116 exchanges data frames with wireless client 110 over WLAN 106, as shown at 212.

When a wireless client 110 wishes to leave WLAN 106, that wireless client 110 transmits an IEEE 802.11 de-authentication frame, which is received by WLAN interface 128 of wireless access point 102, as shown at 214. In response to the de-authentication frame, device processor 124 causes host processor 116 to enter the low-power mode, as shown at 216. In particular, device processor 124 issues a command to host device 112 that causes host device to enter the low-power mode. Throughout this second power-save mode, wireless network device 114 continues to handle beaconing and probes over WLAN 106.

In some embodiments, other power-saving enhancements are implemented. For example, while host device 112 is in low-power mode, wireless network device 114 can operate in limited MIMO mode (for example employing 1×1 or 2×2 chains instead of 3×3) to save power. Wireless network device 114 switches to full MIMO mode when handling clients. This limited MIMO mode has a shorter range compared to full MIMO mode because only a subset of antennas is used for transmission. Therefore, beaconing can be done by alternating between antennas in order to avoid bad antenna positioning.

As another example, device processor 124 can be configured for low power mode using a wait-for-interrupt technique. According to this technique, device processor 124 can enter a low-power mode until interrupted to perform beacon transmission, or when a probe request frame is received. This low-power mode can be implemented by operating device processor 124 at a lower clock frequency, gating off unused elements, and the like.

Figure 3:
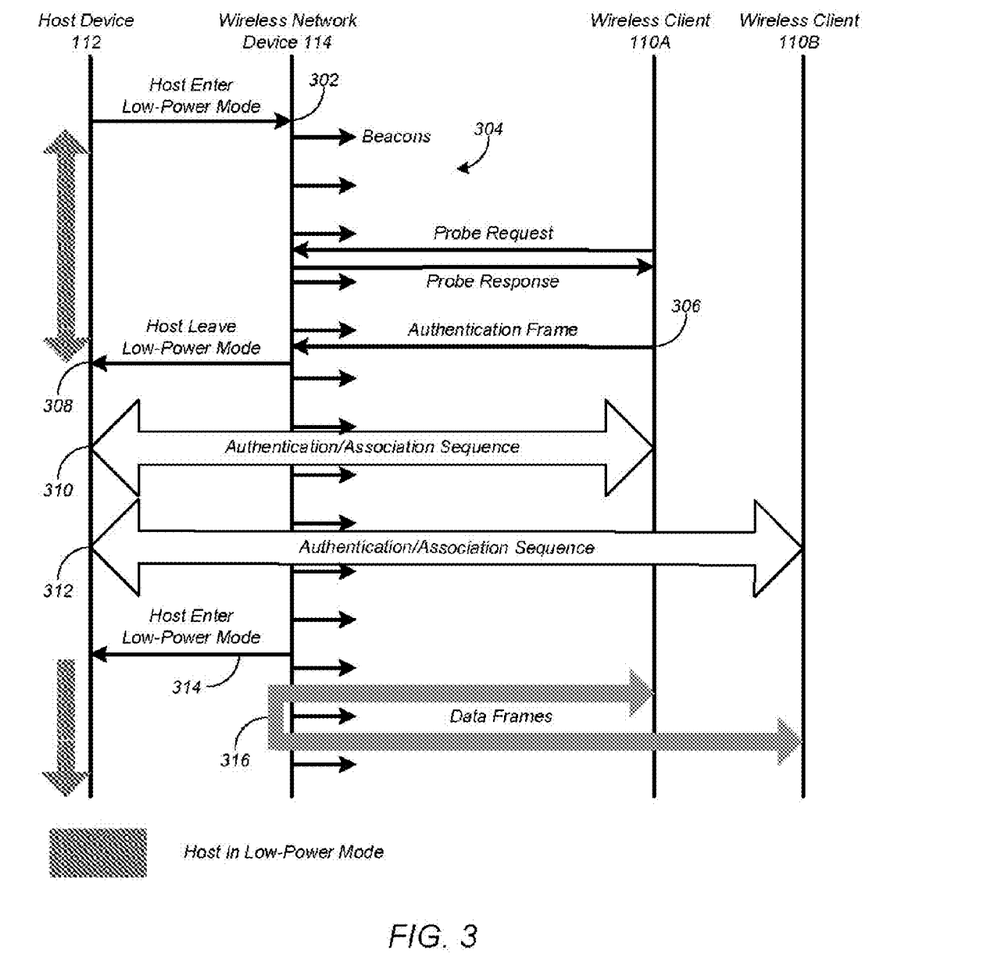
FIG. 3 illustrates a power-save mode according to a third embodiment.

According to a third power-save mode, discovery functionality on WLAN 106 and intra-BSS data forwarding is handled by wireless network device 114. Host device 112 can remain in low-power mode until a client attempts to connect, when host device 112 leaves low-power mode to handle authentication and association. This third power-save mode can be used when connections with multiple wireless clients 110 are active, the wireless clients 110 are either legacy or 802.11n with low throughput requirements (that is, no aggregation is needed), and traffic is intra-BSS. Host device 112 leaves low-power mode when a wireless client 110 attempts to connect, when a data frame is received which can not be forwarded using intra-BSS information (for example, data frames destined to host device 112 or LAN 108), when an 802.11n aggregation request is received over WLAN 106, or when protocol frames that require the attention of host device 112 are received (for example action frames and the like). Host device 112 passes connection and other proxy context to wireless network device 114 when activating this mode. Upon exiting this mode, wireless network device 114 passes updated context (if any) back to host device 112.

FIG. 3 illustrates this third power-save mode according to one embodiment.

Referring to FIG. 3, host device 112 enters low-power mode, either autonomously or in response to a command issued by wireless network device 114, as shown at 302. While host device 112 remains in low-power mode, wireless network device 114 handles beaconing and probes, as shown at 304. In particular, without communicating with host processor 116, device processor 124 causes WLAN interface 128 to transmit IEEE 802.11 beacon frames, and to transmit IEEE 802.11 probe response frames in response to received IEEE 802.11 probe request frames.

When a wireless client 110A wishes to exchange data frames with wireless access point 102, wireless client 110A transmits an IEEE 802.11 authentication frame, which is received by WLAN interface 128 of wireless access point 102, as shown at 306. In response to the authentication frame, device processor 124 causes host processor 116 to leave the low-power mode, as shown at 308, and to authenticate, and associate with, wireless client 110A, as shown at 310. In particular, device processor 124 issues a command to host device 112 that causes host device to leave the low-power mode. After leaving the low-power mode, host processor 116 authenticates, and associates with, wireless client 110A. In this example, host processor 116 also authenticates, and associates with, another wireless client 110б, as shown at 312.

In this third power-save mode, wireless network device 114 also handles the exchange of data frames with wireless clients 110. Therefore, after authenticating, and associating with, wireless clients 110, host processor 116 enters the low-power mode, as shown at 314. In particular, wireless network device 114 exchanges data frames with wireless clients 110 over WLAN 106 without communicating with host processor 116, as shown at 316. Throughout this third power-save mode, wireless network device 114 continues to handle beaconing and probes over WLAN 106.

In some embodiments, additional power savings for host device 112 can be attained by implementing certain functionality on wireless network device 114 to increase the time spent by host device 112 in low power mode. For example, wireless network device 114 can implement stateless protocol handling (for example such as 802.11k action frames and the like), stateless (or minimal state) protocol proxy code (such as ARP proxy, Bonjour keep alive packet proxy, and the like), and periodic housekeeping tasks needed to maintain clients (such as PSK group rekey and the like).

Figure 4:
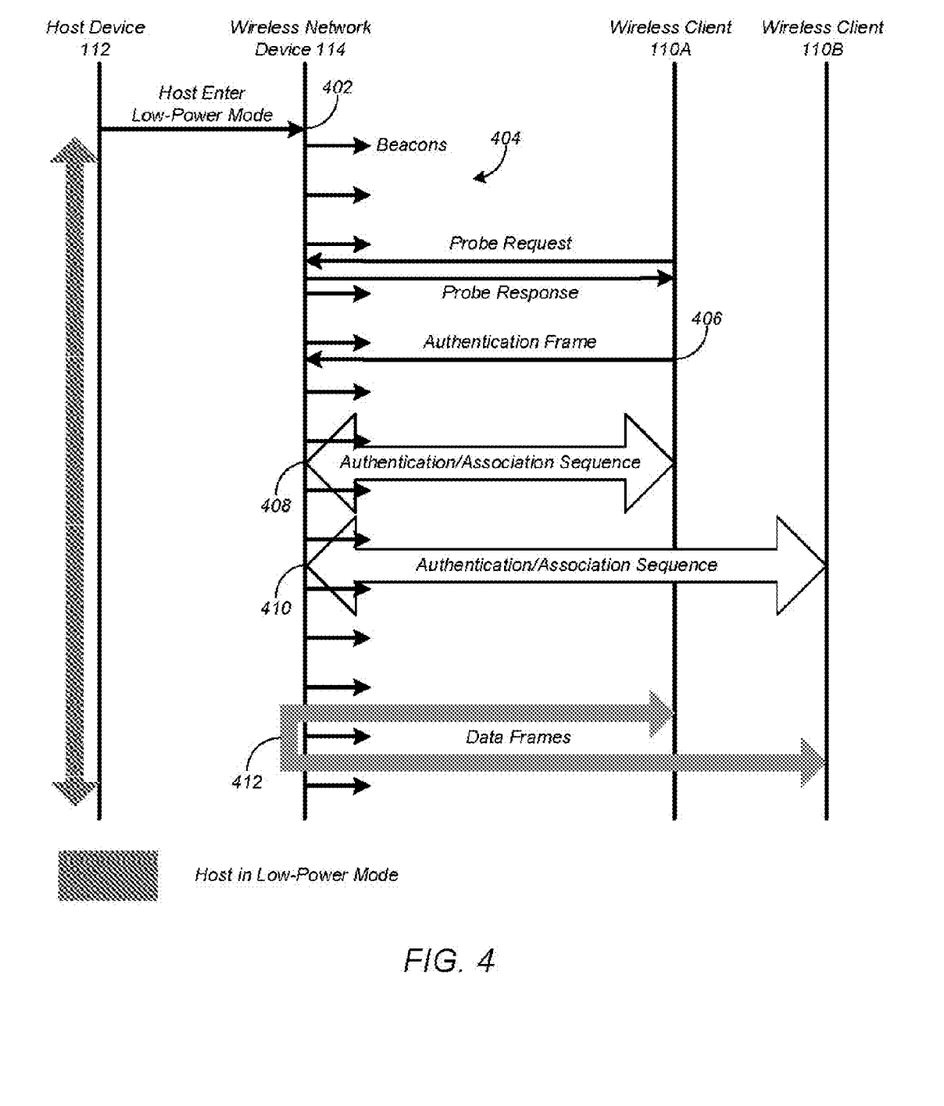
FIG. 4 illustrates a power-save mode according to a fourth embodiment.

According to a fourth power-save mode, wireless network device 114 handles discovery functionality on WLAN 106, authentication, association, and intra-BSS data forwarding. In particular, device processor 124 authenticates, and associates with, wireless client 110 without communicating with host processor 116, when WLAN interface 128 receives an IEEE 802.11 authentication frame from wireless client 110 over the WLAN 106. In addition, wireless network device 114 exchanges data frames with wireless client 110 over the WLAN 106 without communicating with host processor 116.

Host device 112 leaves low-power mode when a data frame is received which can not be forwarded using intra-BSS information (for example, data frames destined to host device 112 or LAN 108), when an 802.11n aggregation request is received over WLAN 106, or when protocol frames that require the attention of host device 112 are received (for example action frames and the like).

Host device 112 passes connection and other proxy context to wireless network device 114 when activating this mode. Upon exiting this mode, wireless network device 114 passes updated context (if any) back to host device 112. This mode requires significant context transition between wireless network device 114 and host device 112. Thus, this mode may not be suitable for systems that implement the 802.11 stack on host device 112, such as net80211 on NetBSD or mac80211 on Linux.

FIG. 4 illustrates this fourth power-save mode according to one embodiment. Referring to FIG. 4, host device 112 enters low-power mode, either autonomously or in response to a command issued by wireless network device 114, as shown at 402. While host device 112 remains in low-power mode, wireless network device 114 handles beaconing and probes, as shown at 404. In particular, without communicating with host processor 116, device processor 124 causes WLAN interface 128 to transmit IEEE 802.11 beacon frames, and to transmit IEEE 802.11 probe response frames in response to received IEEE 802.11 probe request frames.

When a wireless client 110A wishes to exchange data frames with wireless access point 102, wireless client 110A transmits an IEEE 802.11 authentication frame, which is received by WLAN interface 128 of wireless access point 102, as shown at 406. In response to the authentication frame, wireless network device 114 authenticates, and associates with, wireless client 110A, as shown at 408. In particular, device processor 124 authenticates, and associates with, wireless client 110A without communicating with host processor 116. In this example, device processor 124 also authenticates, and associates with, another wireless client 110б, as shown at 410.

In this fourth power-save mode, wireless network device 114 also handles the exchange of data frames with wireless clients 110. In particular, wireless network device 114 exchanges data frames with wireless clients 110 over WLAN 106 without communicating with host processor 116, as shown at 412. Throughout this third power-save mode, wireless network device 114 continues to handle beaconing and probes over WLAN 106.

Additional power savings can be attained in any of the above modes in other ways. For example, the firmware in wireless network device 114 can dynamically control the clock speed of device processor 124 by monitoring throughput requirements at run time. Similarly, the firmware can dynamically enable the number of antennas/chains in service according to throughput. This can be done based on monitoring bandwidth utilization dynamically.

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

The invention claimed is:

1. An access point comprising:
    a first processor, wherein the first processor is configured to transition between a first power mode and a second power mode, wherein the first processor consumes less power in the second power mode than in the first power mode; and
    a network device separate from the first processor, wherein the network device comprises
        a first interface,
        a second interface in communication with a first client device over a wireless local-area network, and
        a second processor configured to, while the first processor is in the second power mode, (i) cause the second interface to transmit a beacon, or (ii) receive a probe request from the first client device,
        wherein the second interface, while the first processor is in the second power mode, is configured to (i) based on the beacon or the probe request, transmit a probe response over the wireless local-area network to the first client device, and (ii) based on the probe response, receive an authentication frame from the first client device, and
        wherein the second processor is configured to, in response to the authentication frame, signal the first processor via the first interface to transition to the first power mode.

2. The access point of claim 1, wherein the second processor, without receiving a signal from the first processor, is configured to (i) cause the second interface to transmit the beacon, or (ii) receive the probe request from the first client device.

3. The access point of claim 1, wherein the second interface, without the network device receiving a signal from the first processor, is configured to (i) based on the beacon or the probe request, transmit the probe response over the wireless local-area network to the first client device, and (ii) based on the probe response, receive the authentication frame from the first client device.

4. The access point of claim 1, wherein the first processor is configured to, subsequent to the second interface receiving the authentication frame and while operating in the first power mode, authenticate the first client device via the network device.

5. The access point of claim 4, wherein the second processor is configured to, subsequent to the first processor authenticating the first client device via the network device, signal the first processor via the first interface to transition to the second power mode.

6. The access point of claim 4, wherein the first processor is configured to, subsequent to the first processor authenticating the first client device, exchange data with the first client device via the network device.

7. The access point of claim 4, wherein:
    the first processor is configured to, subsequent to the second interface receiving the authentication frame and while operating in the first power mode, authenticate a second client device via the network device; and
    the second processor is configured to (i) via the first interface, signal the first processor to transition to the second power mode, and (ii) while the first processor is in the second power mode, transfer data between the first client device and the second client device without transferring the data to the first processor.

8. The access point of claim 1, further comprising a host device, wherein:
    the host device comprises the first processor and a third interface;
    the third interface is connected to a wired local-area network; and
    the first processor is configured to, subsequent to the second interface receiving the authentication frame, transfer data between the wired local-area network and the first client device.

9. The access point of claim 1, wherein the second processor is configured to, subsequent to the second interface receiving the authentication frame and the first processor transitioning to the first power mode, cause the first processor to transition to the second power mode in response to the second interface receiving a de-authentication frame from the first client device over the wireless local-area network.

10. The access point of claim 1, wherein the second processor is configured to, in response to the second interface receiving the authentication frame from the first client device over the wireless local-area network, authenticate the first client device without communicating with the first processor.

11. The access point of claim 10, wherein the second processor is configured to, subsequent to the authentication of the first client device, exchange data with the first client device over the wireless local-area network without communicating with the first processor.

12. A method of operating an access point, wherein the access point comprises a first processor and a network device, wherein the network device is separate from the first processor, and wherein the network device comprises a first interface, a second interface and a second processor, the method comprising:
    transitioning the first processor from a first power mode to a second power mode, wherein the first processor consumes less power in the second power mode than in the first power mode;
    communicating via the second interface with a first client device over a wireless local-area network;
    while the first processor is in the second power mode and via the second processor, (i) causing the second interface to transmit a beacon, or (ii) receiving a probe request from the first client device;
    while the first processor is in the second power mode, (i) based on the beacon or the probe request, transmitting a probe response from the second interface over the wireless local-area network to the first client device, and (ii) based on the probe response, receiving an authentication frame from the first client device via the second interface; and
    in response to the authentication frame, signaling the first processor via the second processor and the first interface to transition to the first power mode.

13. The method of claim 12, comprising, without the network device receiving a signal from the first processor and via the second processor, (i) causing the second interface to transmit the beacon, or (ii) receiving the probe request from the first client device.

14. The method of claim 12, comprising, without the network device receiving a signal from the first processor, (i) based on the beacon or the probe request, transmitting the probe response from the second interface over the wireless local-area network to the first client device, and (ii) based on the probe response, receiving the authentication frame from the first client device via the second interface.

15. The method of claim 12, further comprising, subsequent to the second interface receiving the authentication frame and while the first processor is operating in the first power mode, authenticating the first client device via the network device.

16. The method of claim 15, further comprising, subsequent to the first processor authenticating the first client device via the network device, signaling the first processor to transition to the second power mode.

17. The method of claim 15, further comprising, subsequent to the first processor authenticating the first client device, exchanging data with the first client device via the network device.

18. The method of claim 15, further comprising:
subsequent to the second interface receiving the authentication frame and while operating in the first power mode, authenticating a second client device via the network device;
via the second processor and the first interface, signaling the first processor to transition to the second power mode; and
while the first processor is in the second power mode, transferring data between the first client device and the second client device without transferring the data to the first processor.

19. The method of claim 12, further comprising, subsequent to the second interface receiving the authentication frame and via the first processor, transferring data between a wired local-area network and the first client device, wherein:
the access point comprises a host device; and
the host device comprises a third interface connected to the wired local-area network.

20. The method of claim 12, further comprising, subsequent to the second interface receiving the authentication frame and the first processor transitioning to the first power mode, causing the first processor to transition to the second power mode in response to the second interface receiving a de-authentication frame from the first client device over the wireless local-area network.

* * * * *